United States Patent [19]
Gentile et al.

[11] Patent Number: 5,645,193
[45] Date of Patent: Jul. 8, 1997

[54] DISPENSING CONTAINER WITH TELESCOPICALLY ARRANGED DISPOSABLE REFILL CARTRIDGE AND REUSABLE BASE

[75] Inventors: James Gentile, Orange; John Eimer, Danbury, both of Conn.

[73] Assignee: Chesebrough-Pond's USA Co., Greenwich, Conn.

[21] Appl. No.: 705,370

[22] Filed: Aug. 29, 1996

[51] Int. Cl.⁶ .................................................. B67D 5/52
[52] U.S. Cl. .............................................. 222/137; 222/546
[58] Field of Search ................................. 222/137, 546, 222/327

[56] References Cited

U.S. PATENT DOCUMENTS

| | | | |
|---|---|---|---|
| 4,538,920 | 9/1985 | Drake | 222/137 X |
| 4,687,663 | 8/1987 | Schaeffer. | |
| 4,852,774 | 8/1989 | Crawford | 222/546 X |
| 4,979,942 | 12/1990 | Wolf et al. | 222/137 X |
| 5,020,694 | 6/1991 | Pettengill. | |
| 5,038,963 | 8/1991 | Pettengill et al.. | |
| 5,289,949 | 3/1994 | Gentile. | |
| 5,335,827 | 8/1994 | Gentile. | |

*Primary Examiner*—Gregory L. Huson
*Attorney, Agent, or Firm*—Milton L. Honig

[57] ABSTRACT

A multi-cavity dispensing container is provided for the co-extrusion of at least two flowable materials. The container includes a refill cartridge and a reusable base. The cartridge contains a pair of separate parallel cylinders within which are carried the flowable materials. At a lower end of each cylinder is a piston head. The lower surface of the piston head is configured as a hollow recess. The reusable base is formed with a pair of separate parallel piston support posts. These posts are characterized by a central hub surrounded with at least two outwardly projecting arms. Tops of the posts can readily engage within the recesses of the piston heads. Consequently the refill cartridge and reusable base can be readily engaged and disengaged from one another.

5 Claims, 2 Drawing Sheets

DISPENSING CONTAINER WITH TELESCOPICALLY ARRANGED DISPOSABLE REFILL CARTRIDGE AND REUSABLE BASE

THE BACKGROUND OF THE INVENTION

1. Field of the Invention

The present invention relates to rigid telescopically arranged multi-cavity dispensing containers for flowable material, such as toothpaste, from which it is desired to dispense simultaneously two or more reactive substances which require separate storage until time of use. More particularly the invention relates to a disposable refill cartridge and reusable base combination. Most especially the invention provides a reusable base of improved separability from the disposable refill cartridge that can also be more rapidly manufactured.

1. The Related Art

Multi-cavity dispensing containers are useful in a variety of consumer products. These uses include the delivery of epoxy adhesives, skin treatment products, hair colorants and toothpastes. For several years in the U.S. Mentadent® toothpaste has employed a multi-cavity dispensing pump. Baking soda and hydrogen peroxide in respective flowable carriers are stored separately in different cavities of the pump. Absent separation, these ingredients would react and decompose in storage. Only upon dispensing do the ingredients mix together for use in a consumer's mouth.

The basic concept for a Mentadente product type packaging is disclosed in U.S. Pat. No. 4,687,663 (Schaeffer). Therein is described a rigid pump-type dual-cavity dispenser having two closely positioned but separate outlets. A respective dual material stream of peroxide and baking soda is extruded from these outlets. Among shortcomings of this disclosure is failure to consider the possibility that the two component streams might have different rheologies. These differences lead to improperly proportioned quantities of the two materials when being dispensed from the container.

U.S. Pat. No. 5,038,963 (Peffengill et al.) and U.S. Pat. No. 5,020,694 (Pettengill) resolve the problem of delivering two or more materials of different rheologies. A rigid piston type multi-cavity pump is reported having lower and upper body members. The lower body member has a base and two or more pistons attached. The upper body member has parallel cylinders for containing the flowable materials and an outlet mechanism for dispensing these materials. The lower end of the cylinders receive the pistons whereby the relative compression of upper and lower body members forces the flowable materials out through the outlet mechanism. This produces a single, banded unmixed stream of material that can be neatly and easily applied onto the narrow width of a toothbrush. Upper and lower members cannot be sold as separate independent units because pistons of the lower member are needed to seal the flowable material within the upper member. In addition, ridges formed on both the upper and lower body members prevent them from being pulled apart. After the contents of the pump are exhausted, both upper and lower body members must by necessity be discarded. Recyclability would be highly desirable for economic and environmental reasons.

U.S. Pat. No. 5,289,949 and U.S. Pat. No. 5,335,827, both to Gentile, report engineering improvements on the basic Mentadent® pump which at least partially address the recyclability issue. A refill cartridge separately housing baking soda and peroxide is utilized in conjunction with a reusable base. Upon exhaustion of the toothpaste, the empty cartridge can be separated from the base and a refill inserted. The refill cartridge includes two hollow and separate parallel cylinders each having an upper end telescopically and slidingly accommodating a piston head. Unlike the non-refill version, the piston heads are tightly engaged with the upper body (refill cartridge) and are merely contactable with the upper end of hollow pistons formed in the lower body (reusable base). When refill and base are combined, a central portion on the underside of each piston head fits within a respective opening at the upper end of each piston. Contact between piston and cylinder is thereby maintained. Upon downward hand pressure on the refill, the piston presses against the underside of its respective head forcing same upward and causing the toothpaste stream to exit a dispensing mechanism at the top of the refill cartridge.

Beyond environmental and economic advantages, the refill concept has proved commercially quite successful in the Mentadente product. Yet further improvements would be desirable. It would be particularly useful to improve upon the ease of refill cartridge removability, especially to assist consumers afflicted with arthritic and other physical limitations. Another aspect requiring improvement is that of manufacturability. The hollow pistons of the base and piston heads with their central portions can only be molded at a relatively slow rate of production. Manufacturing speeds are inhibited by the relatively long cooling cycles necessary between each extrusion.

Another longstanding problem has been the difficulty of miniaturizing dual cavity pumps intended for sampling and travel.

Accordingly, it is an object of the present invention to provide a multi-cavity dispensing refill cartridge and reusable base system whose parts are easier for consumers to separate, especially inexperienced and physically challenged persons.

Another object of the present invention is to provide a multi-cavity dispensing refill cartridge and reusable base system whose piston and cylinder components can be more rapidly manufactured than those hitherto known.

Still another object of the present invention is to provide a multi-cavity dispensing refill cartridge and reusable base system in miniature sample size form (to deliver 0.5 ounces or less product).

These and other objects of the present invention will more readily be understood from the following summary and detailed description.

SUMMARY OF THE INVENTION

A multi-cavity dispensing container for the co-extrusion of at least two flowable materials is provided including:

a refill cartridge including an outlet mechanism and at least two hollow and separate parallel cylinders, each containing one of the flowable materials, the cylinders having a first generally closed end and a second end slidingly accommodating at least two parallel piston heads which conform to ride sealingly along interior walls of the cylinders so as to force the flowable materials to flow toward the first end of the cylinder upon relative compression of the cylinders and piston heads, the piston heads having an upper and lower surface, the outlet mechanism being in fluid communication with the cylinders and including adjacent outlet openings from which a single banded, unmixed stream of the materials exits the container; and a reusable base having a first and second end, the first end telescopically receiving the second end of the refill cartridge, the base including at least two separate parallel piston support posts having upper and lower ends, the lower ends being attached to the second end of the base and the posts being formed with at least two outwardly projecting arms.

Advantageously the outwardly projecting arms run lengthwise down the posts in a paddle wheel arrangement. Most preferred is a configuration with three arms, but it can be expanded to at least twenty arms, equidistantly arranged around a central hub.

The piston heads on their lower surface preferably are configured each with a hollow recess. Upper ends of the respective posts are facileiy insertable and easily removable from within the piston head recesses. Consequently the refill cartridge and reusable base can also be readily engaged and disengaged from one another.

When the dispensing container of this invention is miniaturized as a sampling vehicle for delivery of less than 1 ounce, more particularly a half ounce or less flowable material, it is advantageous that the outlet openings of the cartridge at a mouth thereof are each shaped as a square or rectangle. Closure of the outlet openings can be achieved by a reclosable cap hinged along one edge adjacent the outlet openings. Complementary square or rectangular shaped plugs are formed on a surface of the cap facing the openings. When the cap is in a closed position, the complementary plugs sealingly fit within the square or rectangle shaped mouth of the outlet openings.

BRIEF DESCRIPTION OF THE DRAWINGS

A better understanding of the present invention will be found in the following description taken in conjunction with the accompanying drawings in which.

DETAILED DESCRIPTION OF THE INVENTION

Figure 1:
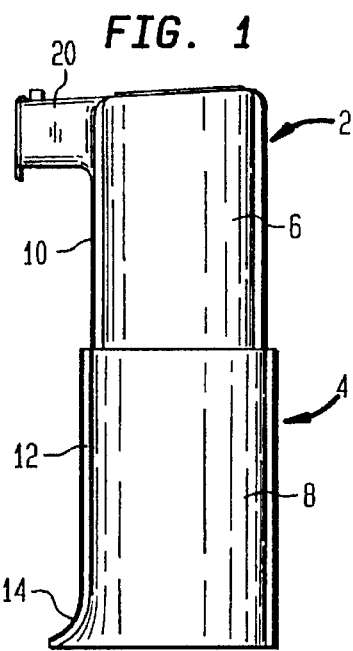
FIG. 1 is a side view of the refill cartridge and reusable base shown engaged with one another.

A preferred embodiment is profiled in FIG. 1. This view illustrates a multicavity dispensing container with a refill cartridge 2, telescopically received in a reusable base 4. Upper and lower shrouds 6, 8 form the outer walls of refill cartridge 2 and reusable base 4, respectively. Upper shroud 6 is arranged to closely conform in sliding relation with lower shroud 8. The upper and lower shrouds 6 and 8 include a mechanism for guiding linear motion between the refill cartridge and reusable base, shown as conforming longitudinal projecting ridges 10 and 12. These ridges are longitudinal, outward, rectangular extensions of the shrouds having parallel sidewalls and flat facing surfaces. When the two shrouds are assembled and compressed the longitudinal ridges 10 and 12 serve to guide the relative motion of the refill cartridge and the reusable base, preventing their relative rocking. They also assist a smooth, equal, linear motion of the piston heads even where the materials and the two cylinders have different rheologies.

The shrouds 6 and 8 may be provided with longitudinal projecting ridges on both their front and back sides. In addition, front ridges may have different widths from the back ridges. These then serve to orient the reusable base with respect to the refill cartridge. This is especially useful when the refill cartridges are used with a reusable base having an extension such as extension 14 in the form of a foot designed to prevent forward tipping of the reusable base and refill cartridge when downward pressure is applied to the latter.

It is understood that the mechanism for guiding linear motion between the refill cartridge and reusable base may be of any acceptable shape. It may also comprise a plurality of extensions, both inward and outward. In addition to providing guided relative motion of the shrouds, the extensions improve the mechanical rigidity of the shrouds.

Figure 2:
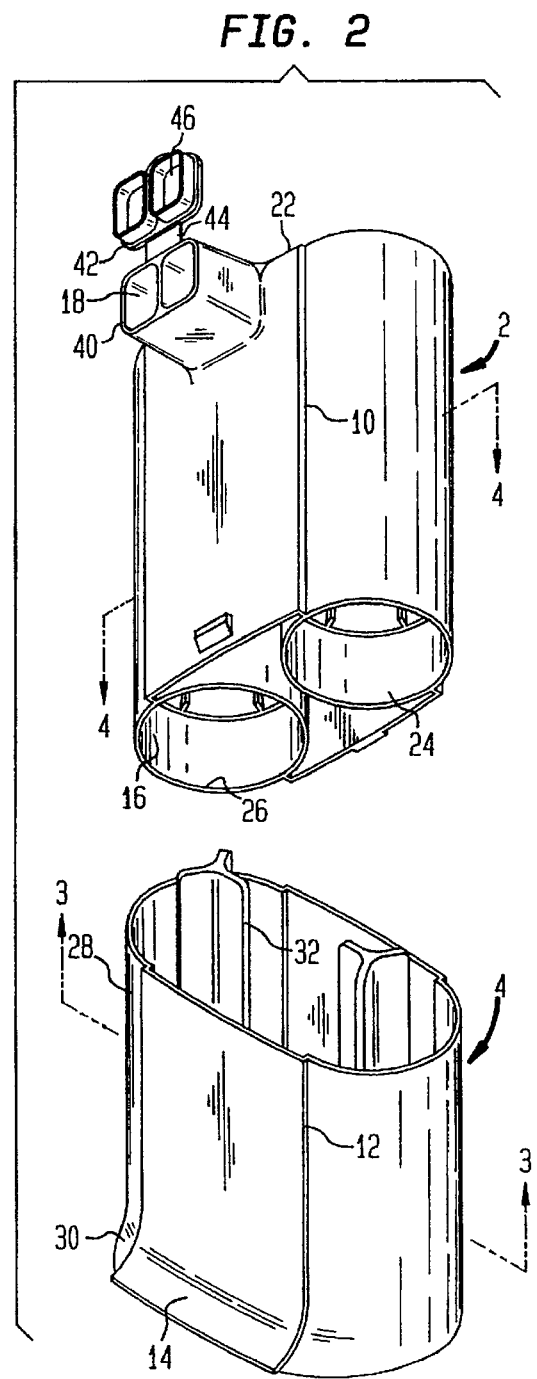
FIG. 2 is an exploded view of refill cartridge and reusable base, the cap being in an open position.
Figure 4:
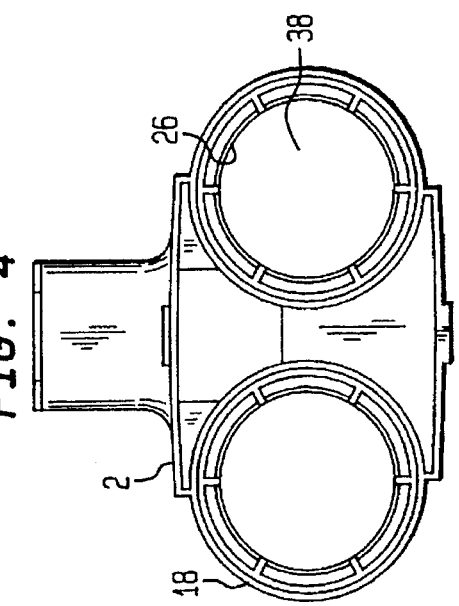
FIG. 4 is a cross-sectional view of the refillable cartridge with pistons assembled taken along line 4—4 of FIG. 2.
Figure 6:
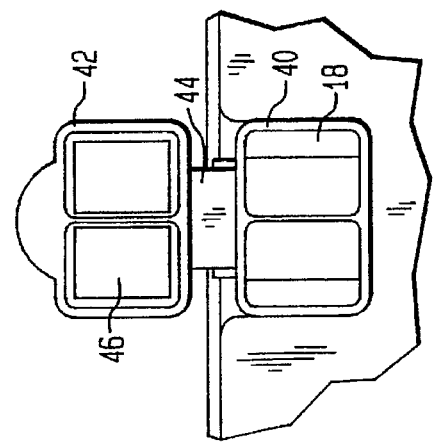
FIG. 6 is a view of the outlet openings and interior surface of the cap in the open position.

FIG. 2 provides an exploded view of the multi-cavity dispensing container. Two hollow, separate, parallel cylinders 16 are incorporated within the upper shroud 6 of the refill cartridge 2. Each cylinder contains one of the two reactive flowable materials. Two cylindrical outlet channels 18 provide fluid communication between the cylinders and an outlet assembly 20.

Top end 22 of each cylinder is generally closed except for the outlet channels 18. Bottom end 24 of each cylinder is sealed by a piston head 26. Thus the flowable materials are completely within the refill cartridge allowing it to be handled and sold as a unit separate and independent from the reusable base.

Figure 3:
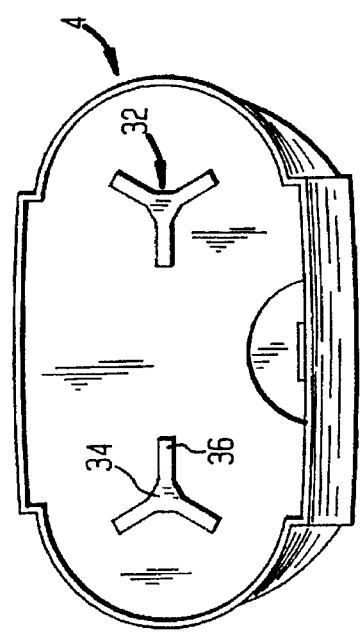
FIG. 3 is a cross-sectional view of the reusable base taken along line 3—3 of FIG. 2.
Figure 5:
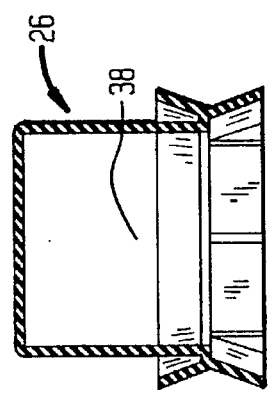
FIG. 5 is a cross-sectional view of a piston head.

The reusable base 4 has a first and a second end 28 and 30, respectively. Within the reusable base are a pair of piston support posts 32 each with an upper and lower end. These posts are oriented parallel to one another with the lower ends being molded unitarily with the second end of the reusable base. FIG. 3 best illustrates the posts as including a solid central hub 34 outwardly from which projects three flat arms 36 extending down the length of the hub. The arms are equidistantly arranged from one another. The upper end of the post is facilely insertable but also easily removable from within a recess 38 of piston head :26.

Outlet channels 18 and a pair of outlet openings 40 form a discharge mouth for the refill cartridge. Outlet openings 40 are rectangularly shaped. A cap 42 is flexibly attached through a hinge 44 along one edge of the outlet openings. A pair of rectangularly shaped plugs 46 are formed on a surface of the cap facing the outlet openings. When cap 42 is in a closed position, the complementary plugs sealingly fit within the rectangular shaped outlet openings to seal them.

While the preferred embodiment of the present invention has been described, those skilled in the art will recognize that other changes and modifications may be made thereto without departing from the spirit and purview of this invention.

What is claimed is:

1. A multi-dispensing container for the co-extrusion of at least two flowable materials comprising:

a refill cartridge comprising an outlet mechanism and at least two hollow and separate parallel cylinders, each containing one of the flowable materials, the cylinders having a first generally closed end and a second end slidingly accommodating at least two parallel piston heads which conform to ride sealingly along interior walls of the cylinders so as to force the flowable materials to flow toward the first end of the cylinder upon relative compression of the cylinders and piston heads, the piston heads having an upper and lower surface, the outlet mechanism being in fluid communication with the cylinders and including adjacent outlet openings from which a single banded, unmixed stream of the materials exits the container; and a reusable base having a first and second end, the first end telescopically receiving the second end of the refill cartridge, the base including at least two separate parallel piston support posts having upper and lower ends, the lower ends being attached to the second end of the base, the upper ends being facilely insertable into a recess of the piston head, the posts being formed with at least two outwardly projecting arms and the arms having lateral clearance from skirt walls of the recess to be easily removable therefrom.

2. The container according to claim 1 wherein the outwardly projecting arms run lengthwise down the posts and are equidistant from one another.

3. The container according to claim 1 wherein the outlet openings each have a square or rectangular shape.

4. The container according to claim 1 further comprising a cap hingedly attached near the outlet openings.

5. The container according to claim 4 wherein the cap has square or rectangular shaped plugs formed on a surface of the cap facing the outlet openings, wherein the outlet openings each have a square or rectangular shape and the plugs sealingly fit within the square or rectangular shaped outlet openings.

* * * * *

UNITED STATES PATENT AND TRADEMARK OFFICE
CERTIFICATE OF CORRECTION

PATENT NO.   : 5,645,193
DATED        : July 8, 1997
INVENTOR(S)  : Gentile et al.

It is certified that error appears in the above-indentified patent and that said Letters Patent is hereby corrected as shown below:

On the title page: Item [73] Assignee

Change "Chesebrogh-Pond's USA Co.," to read
-- Chesebrough-Pond's USA Co., Division of Conopco, Inc. --

Signed and Sealed this

Sixteenth Day of September, 1997

Attest:

BRUCE LEHMAN

*Attesting Officer*    *Commissioner of Patents and Trademarks*